Feb. 25, 1930.  J. A. HYAMS  1,748,227

CLIP

Filed March 8, 1929

Inventor
JOSEPH A. HYAMS,

By
Schley & Trash
Attorneys

Patented Feb. 25, 1930

1,748,227

UNITED STATES PATENT OFFICE

JOSEPH A. HYAMS, OF NEW YORK, N. Y.

CLIP

Application filed March 8, 1929. Serial No. 345,380.

It is the object of my invention to produce a clip which is especially adaptable for compressing the male urethra, and especially the meatal portion thereof, to effect retention therein of solutions which are applied for medication or for anæsthesia; which is effective to do this with little or no pain to the patient; which can readily be manipulated, adjusted, and removed by one-hand operation; which is simple in construction, and readily sterilizable; and which is substantially free from danger of causing injury to the glans.

Figure 1:
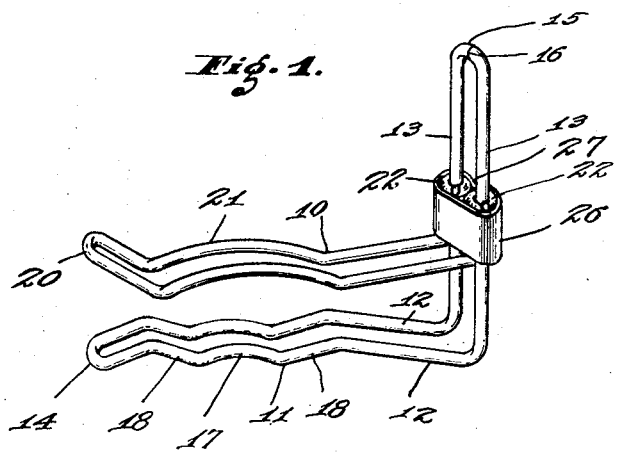
Figure 2:
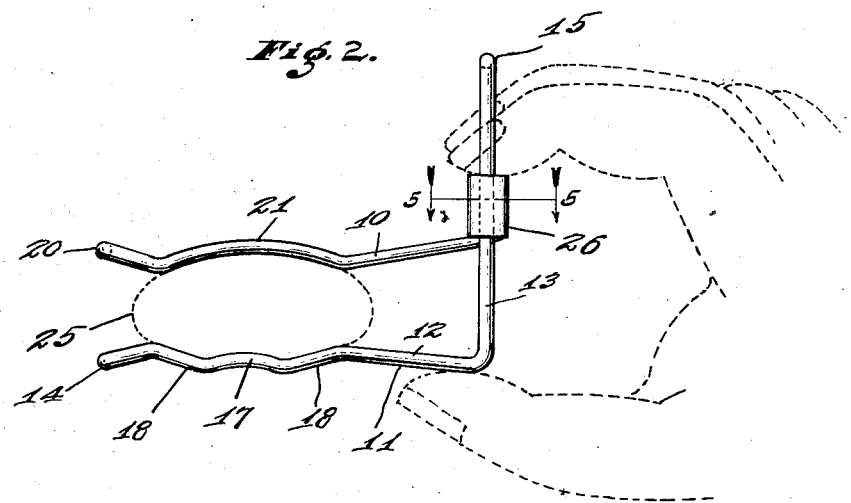
Figures 3, 4:
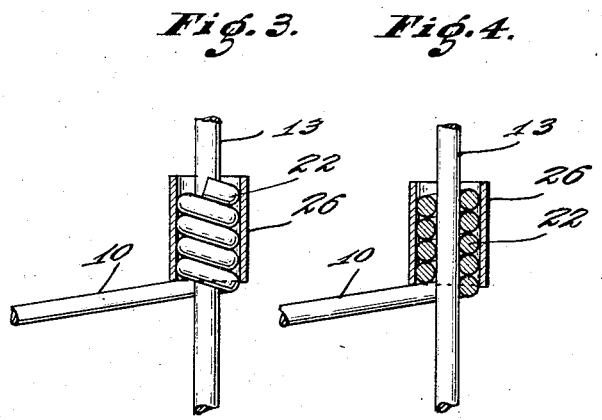
Figure 5:
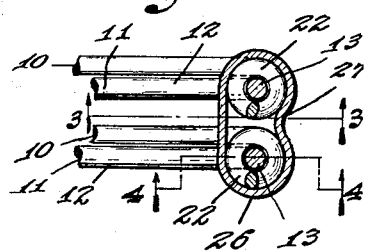

The accompanying drawing illustrates my invention: Fig. 1 is a perspective view of a clip which is constructed in accordance with my invention; Fig. 2 is an elevation of such clip, showing it in compressing position, and showing one method of manipulating it; Fig. 3 is an enlarged longitudinal section, substantially on the line 3—3 of Fig. 5, showing one of the clamping coils of wire in elevation; Fig. 4 is a similar section, but taken substantially on the line 4—4 of Fig. 5; and Fig. 5 is an enlarged transverse section, substantially on the line 5—5 of Fig. 2.

The clip consists fundamentally of two relatively movable members 10 and 11. Each of these is made of a single length of wire. The lower part 11 consists of generally horizontal and generally upright portions, the horizontal portion consisting of two wires 12 and the upright portion of two wires 13 which are continuations of the wires 12. The two wires 12 at their end remote from the uprights 13 are joined by a hairpin bend 14, and the uprights 13 at their ends remote from the horizontal portions 12 are joined by a hairpin bend 15. In making the structure, the joint 16, which is usually a soldered joint, is located at the hairpin bend 15. The uprights 13 are straight, and desirably there is a springing at the hairpin bend 15 that tends to spread apart the lower ends of the two uprights 13, for reasons which will be hereinafter apparent. The horizontals 12 each consist of a central upwardly bowed portion 17, flanked on either side by a portion 18 which extends obliquely upward from the end of the bowed portion 17. The bowed portion 17 is for pressing inward the lower wall of the urethra.

The upper port 10 has a horizontal portion, comprising two substantially parallel wires joined by a hairpin bend 20 at their outer ends. Near the hairpin bends 14 and 20, the lower and upper members 11 and 10 preferably flare slightly obliquely downward and upward respectively. At an intermediate portion of their length, these horizontal wires are formed into upwardly-bowed portions 21, of greater extent than the bowed portions 17. However, the bowed portions 17 and 21 are desirably symmetrical with respect to the same medial plane between the ends of the bowed portions. The vertical planes of the horizontal wires of the upper portion 10 are offset slightly from the vertical planes of the horizontal wires of the lower part 11, as is clear from Fig. 5; but this makes for a firmer compression of the urethra, with less danger of injury. That is, one of the wires of the lower part lies in a plane between the two planes of the wires of the upper part; and one of the wires of the upper part lies in a plane between the planes of the two wires of the lower part; so that in their compressing action on the meatus they may produce a sinuous bending rather than a direct compression. In addition, by reason of this offsetting, the ends of the horizontal wires of the upper part 10 may pass tangentially into helical coils 22, formed integral with the wires of the upper portion 10, and encircling the two upright wires 13 of the lower part 11. Each of the coils 22 desirably has several turns around the associated upright 13; and is wound of such diameter that it has a fairly tight sliding fit on the associated upright 13. By reason of this sliding fit, the upper part may be slid on the uprights 13 of the lower part if the sliding pressure is applied at or near the helixes 22, whether for upward or downward movement on such uprights; whereas if pressure is applied at the points remote from such helixes 22, say in the neighborhood of the arches 17 and 21, there is a cocking of the upper part 10 on the lower part 11, and a binding of the helixes 22 on the uprights 13 that effectually prevents the two parts from sliding relatively to each other.

This makes it possible for the operator to apply the clip with one hand, as indicated in Fig. 2, by applying pressure substantially in the line of the helixes 22 to move the two parts of the clip together or apart. This enables the operator to apply the device generally with any desired adjustment upon the glans 25, indicated in dotted lines in Fig. 2. However, the reaction thereof against the arches 17 and 21 cocks the two members with respect to each other, so that they will remain in the adjusted position without slipping, until removed by the operator by pressure substantially in the line of the helixes 22.

It is to assist in the clamping action, and in the tendency for the two parts of the clip to remain in any adjusted position, that the two uprights 13 are made to have a spring tending to separate their lower ends. This tends to spread the two uprights 13 in the helixes 22, to provide additional friction which prevents accidental relative displacement between the two parts.

To assist in this last-mentioned action, as well as to hold the helixes tightly wound and in the desired relative position, a sheet-metal casing 26 may be put around such two helixes. This casing is an endless sheet-metal casing, desirably with a slight indentation 27 on one or each of its two sides in the plane between the two helixes 22, as is clear from Fig. 5, and may have a soldered joint 28 in one of such sides.

I claim as my invention:

1. A urethral clip, comprising two relatively sliding parts, one of said parts having two portions substantially perpendicular to each other, and the other part having a portion generally parallel to one of the portions of the first part slidably mounted on the other portion of the first part with a mounting which permits ready sliding by pressure substantially in the line of said second portion of the first part but which resists such sliding by being cocked if such pressure is applied to the two parts on a line remote from said first-named line.

2. A urethral clip, comprising two relatively sliding parts, one of said parts having two portions substantially perpendicular to each other, and the other part having a portion generally parallel to one of the portions of the first part slidably mounted on the other portion of the first part with a mounting which permits ready sliding by pressure substantially in the line of said second portion of the first part but which resists such sliding by being cocked if such pressure is applied to the two parts on a line remote from said first-named line, the first-named portion of said first part having an arched portion for compressing the urethral wall.

3. A urethral clip, comprising a first part consisting of two generally parallel wires each bent at right angles at an intermediate point and joined at their ends to form generally horizontal and generally upright portions, and a second part composed of two parallel wires joined at one end but at the other end wound into helixes which encircle the upright portions of the wires of the first part to provide sliding members on such upright wires.

4. A urethral clip, comprising a first part consisting of two generally parallel wires each bent at right angles at an intermediate point and joined at their ends to form generally horizontal and generally upright portions, and a second part composed of two parallel wires joined at one end but at the other end wound into helixes which encircle the upright portions of the wires of the first part to provide sliding members on such upright wires, the generally horizontal portions of the wires of the first part having intermediate arch-shaped portions for compressing the urethral wall.

5. A urethral clip, comprising a first part consisting of two generally parallel wires each bent at right angles at an intermediate point and joined at their ends to form generally horizontal and generally upright portions, and a second part composed of two parallel wires joined at one end but at the other end wound into helixes which encircle the upright portions of the wires of the first part to provide sliding members on such upright wires, the horizontal portions of each of said parts having intermediate upwardly arched portions, the arched portions of the lower part being of less extent than the arched portions of the upper part.

6. A urethral clip, comprising a first part consisting of two generally parallel wires each bent at right angles at an intermediate point and joined at their ends to form generally horizontal and generally upright portions, and a second part composed of two parallel wires joined at one end but at the other end wound into helixes which encircle the upright portions of the wires of the first part to provide sliding members on such upright wires, the horizontal portions of each of said parts having intermediate upwardly arched portions.

7. A urethral clip, comprising a first part consisting of two generally parallel wires each bent at right angles at an intermediate point and joined at their ends to form generally horizontal and generally upright portions, and a second part composed of two parallel wires joined at one end but at the other end wound into helixes which encircle the upright portions of the wires of the first part to provide sliding members on such upright wires, and a casing enclosing said helixes to hold them at a definite distance apart.

In witness whereof I, JOSEPH A. HYAMS, have hereunto set my hand at New York city, N. Y., this 27th day of February, A. D. one thousand nine hundred and twenty nine.

JOSEPH A. HYAMS.